United States Patent [19]

Bouyoucos et al.

[11] Patent Number: 4,601,768
[45] Date of Patent: Jul. 22, 1986

[54] METHOD AND APPARATUS FOR TREATING PLASTIC WELDS TO RELIEVE STRESSES THEREIN

[75] Inventors: John V. Bouyoucos, Pittsford; David W. Durfee, Rochester, both of N.Y.

[73] Assignee: Hydroacoustics, Inc., Rochester, N.Y.

[21] Appl. No.: 609,539

[22] Filed: May 11, 1984

[51] Int. Cl.⁴ .................. B29C 65/06; B29C 65/18
[52] U.S. Cl. .................. 156/73.5; 156/154; 156/267; 156/304.6; 156/309.6; 156/309.9; 156/312; 156/499; 156/580; 264/68; 264/161; 264/248; 425/456; 425/460; 425/806 R
[58] Field of Search ............... 156/73.1, 73.5, 304.6, 156/154, 267, 292, 309.6, 312, 580, 580.1, 499, 309.9; 264/23, 68, 161, 248; 425/456, 460, 806 R, 806 A

[56] References Cited

U.S. PATENT DOCUMENTS

| | | | |
|---|---|---|---|
| 3,501,110 | 3/1970 | Hopgood et al. | 264/68 |
| 3,605,253 | 9/1971 | Calton et al. | 156/73.5 |
| 3,618,196 | 11/1971 | Sluetz | 156/73.5 |
| 4,337,024 | 6/1982 | Turner et al. | 425/363 |
| 4,377,428 | 3/1983 | Toth | 156/73.5 |
| 4,390,384 | 6/1983 | Turner | 156/312 |

Primary Examiner—Michael Wityshyn
Attorney, Agent, or Firm—Martin LuKacher

[57] ABSTRACT

To relieve stresses in a plastic weld which may weaken the weld and increase its susceptibility to solvent-induced crazing or cracking, forces are applied to the weld zone (the interface between welded parts) after it has cooled to solid condition, but preferably when it is at a higher temperature than the regions of the parts adjacent thereto, which forces are higher than the yield strength of the material at the weld zone and lower than the yield strength of the material in the regions of the parts adjacent to the weld zone. The forces thereby cause yielding or plastic deformation which effectively relieves certain thermally induced stresses in the weld. Tensile stresses in the weld are thereby relieved, to reduce susceptibility of the weld to solvent-induced crazing or cracking.

53 Claims, 22 Drawing Figures

METHOD AND APPARATUS FOR TREATING PLASTIC WELDS TO RELIEVE STRESSES THEREIN

DESCRIPTION

The present invention relates to plastic welding, and particularly to methods and apparatus for the treatment of plastic welds to relieve stresses therein.

The invention is especially suitable for use in relieving stresses in large area plastic welds such as may be formed by vibration welding or hot plate welding of automotive parts such as panels, bumpers, and lamp housings, as well as other parts such as pipe fittings and containers requiring high strength and resistance to solvent-induced crazing or cracking. The invention is adapted for use in the plastic welding of various thermoplastic materials, such as polycarbonates, polycarbonate/polyester blends (such as Xenoy which is a trademark of General Electric Company), polyvinylchloride (pvc), and nylon.

Welded plastic joints, whether produced by friction welding (e.g. vibratory welding), hot-plate welding, or other current state-of-the-art thermal welding processes, normally contain residual tensile stresses, both in the weld zone and in the flash extruded from the joint. Residual stresses are believed to arise from differential expansion/contraction of material which occurs during the localized heating, melting, and cooling of material at the joint.

Under conditions of use with exposure to many solvents, such as gasoline and ethylene glycol found in automotive applications, the tensile-stressed areas are highly susceptible to solvent-induced crazing and cracking. Under applied mechanical loading, the solvent-induced cracks act as stress raisers, and may seriously weaken the joint. Where a hermetically sealed joint is required, the solvent-induced cracks may cause functional leakage problems, even in the absence of mechanical loading.

In order to reduce susceptibility to solvent-induced crazing and cracking by current methods, welded joints are often stress relieved by radiant and/or convection heating. The welds may also be sealed to prevent exposure to solvents, by the application of urethane, vinyl, or hot-melt sealants to the edge of the weld. Such current methods are generally time-consuming, expensive, and subject to defects in quality and effectiveness.

It has been suggested that tensile stresses can be relieved by applying compressive forces to the weld. In U.S. Pat. No. 4,390,384, issued June 28, 1983, thin walled sections of battery jars are reheated and compressive forces are applied thereto, followed by a quenching process. U.S. Pat. No. 4,337,024 issued June 29, 1982 proposes rolling the sides of the battery jars, much like pie crust, to deform the material along the weld seam, after reheating and treatment as described in U.S. Pat. No. 4,390,384 has been applied. Metals and welded joints in metals have been cold worked to introduce compressive surface stresses and to relieve stress concentrations by such techniques as shot peening, surface rolling, and planishing (See Deutschman, et al. *Machine Design Theory and Practice*, pp. 125 to 129, 145 and 146).

Cold working is often not suitable for stress relieving of plastic welds in that the forces necessary to relieve the stresses can easily damage the welded parts. Reheating of the welds, before stress relief treatment can be applied, is also unsatisfactory in that time consuming secondary operations are required. Moreover, it is very difficult, especially in large parts, as distinguished from the thin walled battery jars used in the above referenced patents, to adequately reheat the weld zone. Moreover, incidental heating of regions away from the weld zone is often unavoidable. Then, when the parts are compressively loaded, such regions may be permanently deformed, such that the parts are misshapen and dimensionally out of tolerance.

Accordingly, it is the principal object of the present invention to provide improved methods and apparatus for stress-relief treatment of plastic welds whereby thermally induced stresses in the weld may be relieved to a level below at which they adversely affect the weld by giving rise to solvent-induced crazing or cracking or otherwise leave the weld in a weakened condition.

It is another object of the present invention to provide improved methods and apparatus for stress-relief treatment of plastic welds wherein only the region of the weld zone or flash (wherein thermally induced stresses arise) are treated, without adversely affecting other regions of the welded parts.

It is still a further object of the present invention to provide improved methods and apparatus for plastic welding in which stress relieving operations may be carried out, if desired, in the welding machine where the weld is made, thus avoiding the need for secondary operations outside of the machine.

Briefly described, in the stress relief treatment of plastic parts in accordance with an embodiment of the invention, thermally induced stresses in the weld are relieved by applying forces to the welded parts, preferably while the parts are cooling after welding and while the interface, where the weld is formed (the weld zone), is at a higher temperature than the regions of the parts adjacent thereto. During application of the applied force, it is believed that the regions adjacent to the weld zone are only stressed elastically, while the material at the weld zone (being at higher temperature and therefore having a reduced yield strength) is stressed beyond its yield point, resulting in permanent plastic deformation of the weld zone. Upon release of the applied force, the material in regions adjacent to the weld zone returns to its original condition and places a compressive bias on the permanently deformed weld zone. This compressive bias effectively relieves thermally-induced tensile stresses.

The foregoing and other objects, features, and advantages of the invention, as well as presently preferred embodiments thereof, and the best modes now known for practicing the invention, will become more apparent from a reading of the following description in connection with an accompanying drawing in which.

Figure 1:
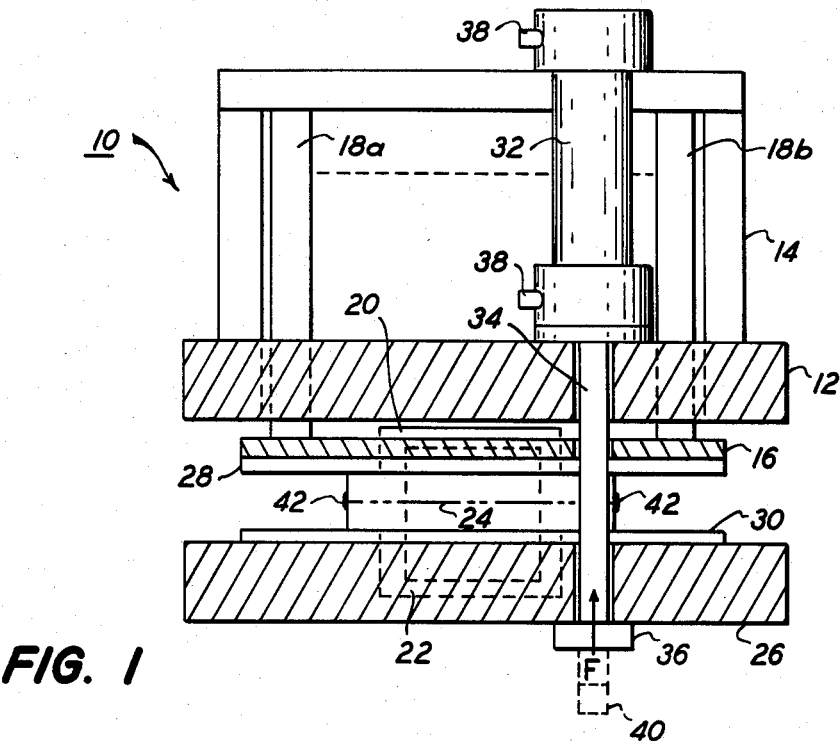
FIG. 1 is an elevational view diagramatically showing a vibration welding machine incorporating the invention.

Referring to FIG. 1, there is shown a vibration welding machine 10. Reference may be had to U.S. Pat. No. 4,086,122 issued in the names of John V. Bouyoucos, Marvin J. Behnfeld and Roger L. Selsam on Apr. 25, 1978, for further information regarding vibration welders of the type shown in FIG. 1, and parts of such welders which are not illustrated in FIG. 1 for the sake of simplicity.

The welder 10 has a massive upper mounting 12. A frame or bridge 14 on the mounting 12 supports a drive plate 16 through an assembly of springs 18, of which only the outer two springs 18a and 18b are illustrated for the sake of simplicity. A driver which is part of the welder, about which more can be learned from the above-referenced Bouyoucos, et al. patent, linearly vibrates the drive plate 16 with respect to a fixed lower platen 26 in order to heat by frictional rubbing the surfaces of plastic parts 20 and 22 at the interface 24 where they are to be welded. The parts 20 and 22 are clamped between the fixed, lower platen 26 and the drive plate 16. Tooling plates 28 and 30 accommodate the shapes of the particular parts. The parts 20 and 22 in this example are rectangular, open in the center and having large flange areas at which the weld interface 24 is formed. The parts 20 and 22 are clamped together by two double-acting hydraulic cylinders, one of which 32 is shown in FIG. 1. More than two such cylinders may be used if additional force is required.

The cylinder 32 actuates a rotating clamp rod 34 with a foot 36. The foot is oblong in shape and rotates 90° from a position where it clears the lower platen 26 to the position shown in FIG. 1. Other mechanisms, such as illustrated in the above-referenced Bouyoucos, et al. patent may be used to lower the platen 26, to enable insertion, and removal of the parts 20 and 22.

After the parts 20 and 22 are inserted, hydraulic fluid is passed via control valves to the cylinder 32 via couplings 38 therein. The clamp rod 34 then pulls in; the foot 36 rotating during upward movement from the extended position of the clamp rod 34 which is shown by dashed lines at 40 in FIG. 1. Low clamp pressure is then applied to the joint interface, say from 100 to 600 psi. The vibratory driver is then turned on for a period of time (the weld time) during which the interface 24 is raised above melting point for the plastic material of the parts 20 and 22. After completion of vibratory driving, the parts continue to be held together with the same low clamp pressure as applied during welding. The parts return to their aligned position and begin to cool. After a delay time, additional high pressure hydraulic fluid is applied to the cylinder 32 so as to apply a much higher clamp pressure, such as from 2,000 to 20,000 psi, to the interface. The direction of the forces which give rise to this pressure is indicated by the arrow and the letter "F" in FIG. 1. The high clamp pressure is maintained for a given period of time so that continued cooling back to ambient temperature does not induce unacceptably high tensile stresses in the welded joint. Some of the molten plastic at the interface escapes during welding to form flash 42 around the periphery of the weld joint at the interface. The interface 24 is also the weld plane. Vibration occurs along that plane while the clamping forces are applied by the cylinder 32 transversely, and in the example shown in FIG. 1, perpendicular to the weld plane.

Figure 2:
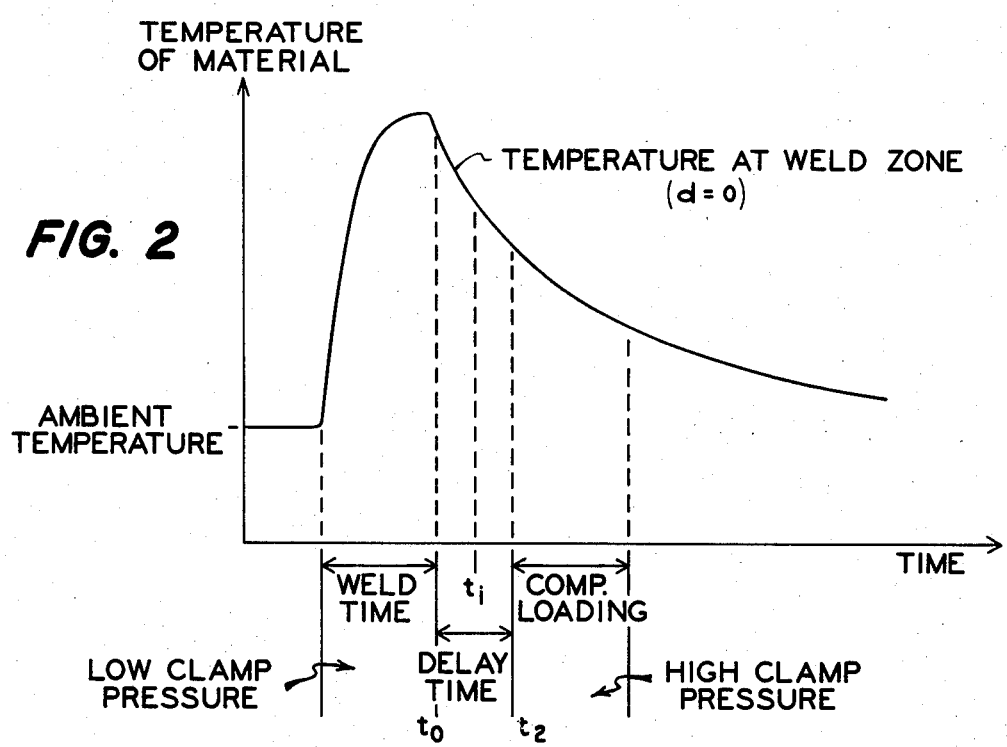
FIG. 2 is a plot of temperature versus time, showing the temperature at the weld zone and also showing when forces for relieving stresses in the weld are applied.
Figure 4:
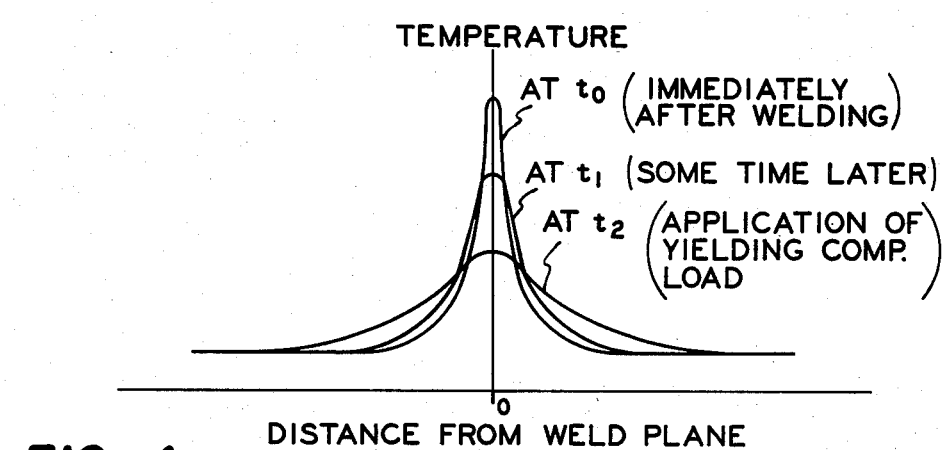

In the absence of the compressive loading phase of the weld cycle, the weld joint, upon cooling, may develop tensile stresses which give rise to weld weakening and stress concentrations. When exposed to solvents such stress raisers have been found to cause crazing and cracking further weakening the weld joint. As shown in FIG. 2, the temperature at the weld plane or interface 24 rises during the weld time sufficiently so that, confined in a zone around the weld plane, the surfaces of the parts are molten. Immediately after welding, at time $t_0$, the weld zone is molten. See also FIGS. 3–5. After a period of time, and particularly at time $t_1$, the parts have fused together at the interface and become solid. The temperature in the weld zone is still well above ambient temperature. In accordance with the invention, cooling proceeds until time $t_2$ at which time the high clamp pressure is applied.

Figure 5:
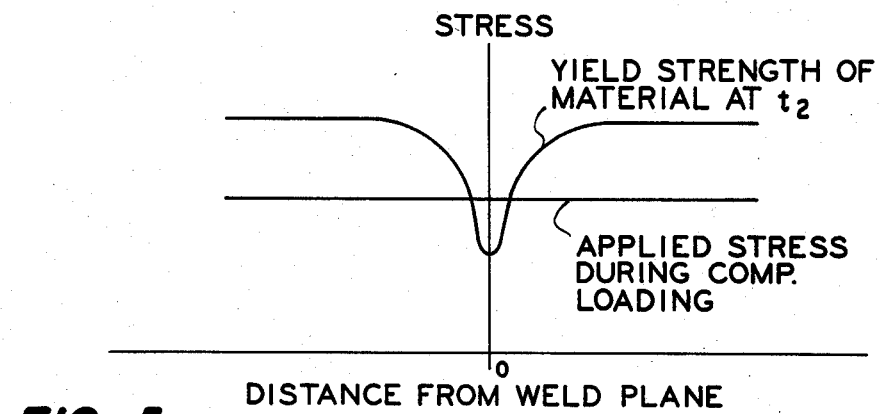
FIGS. 4 and 5 are plots illustrating temperature and stress at different times and at different distances from the weld plane or interface.
Figure 3:
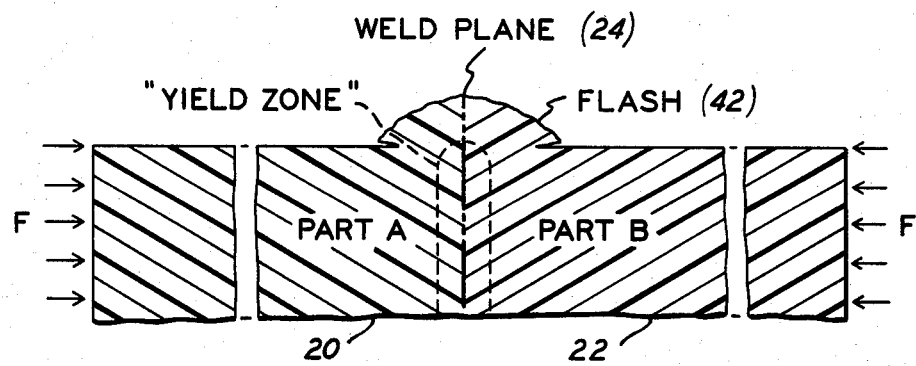
FIG. 3 is an enlarged, fragmentary view showing the welded joint and the yield zone where the stresses are relieved by means of the apparatus shown in FIG. 1.

The delay time, $t_0$ to $t_2$, is important, as will be apparent from FIG. 5. The yield strength of the material outside of the weld zone, and except within a yield zone as shown in FIG. 3, is well above the stress level applied to the parts during compressive loading (with the high clamp pressure). Accordingly, only the material in the yield zone immediately adjacent to the interface is permanently deformed, since the applied stress is greater than its yield strength. Since the applied stress is less than the yield strength of the material in the regions of the parts surrounding the yield zone, these regions are then only elastically deformed. They return to their normal shape when the high pressure is relieved, after the compressive loading phase of the cycle. Compressive stresses then act on the material in the interface to counteract any tensile stresses resulting from differential temperatures and differential cooling rates between the highly heated area at the weld plane or interface 24 and the remainder of the parts. The compressive loading is maintained long enough so that the compressive stresses in the yield zone are locked in after the part has cooled. The weld time, delay time, and compressive loading time will, of course, depend upon the particular part which is to be welded, its size, and the material of which it is constructed. The various durations and forces for compressive loading are adjusted so as to leave residual tensile stresses below an acceptable limit, for example, in automotive parts, below 600 psi where the joint is strong enough to resist solvent-induced crazing and cracking.

Figure 6:
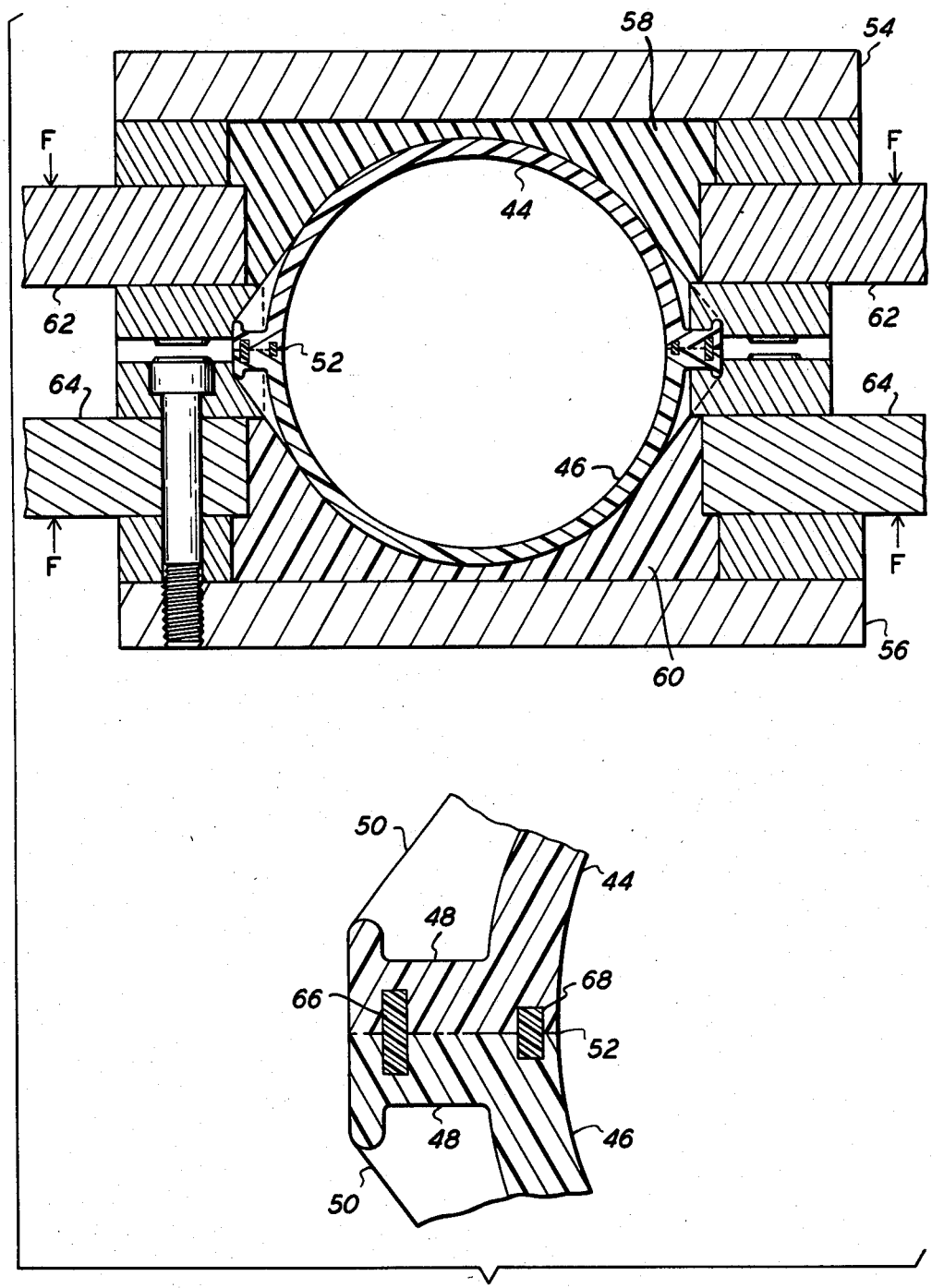
FIG. 6 is a fragmentary sectional view illustrating apparatus in accordance with the invention, applied for the welding of a pipe fitting and which also shows the section containing the joint enlarged.

Referring to FIG. 6, there is shown a cross-sectional view through a pipe fitting made up of upper and lower sections 44 and 46. These sections have flanges 48 reinforced by gussets 50. The interface or weld plane between the parts 46 and 48 is shown at 52 and extends through the flange area 48. Only the upper and lower tooling assembly 54 and 56 are illustrated. The sections are firmly supported as by cast rigid urethane or polyester supports 58 and 60. The compressive forces, indicated by the letters "F" and the arrows, are applied to the weld plane via upper and lower tooling plates 62 and 64. The drive plate is connected to the upper tooling plate and the lower platen of the welding machine is connected to the lower tooling plate 64.

In FIG. 6 (see especially the enlarged section), the flanges 48 of the parts 44 and 46 have openings therein which extend to the weld plane interface. These openings serve as flash traps 66 and 68. The flash, molten plastic extruded from the weld interface during welding, is principally confined in these traps 66 and 68.

Figure 7:
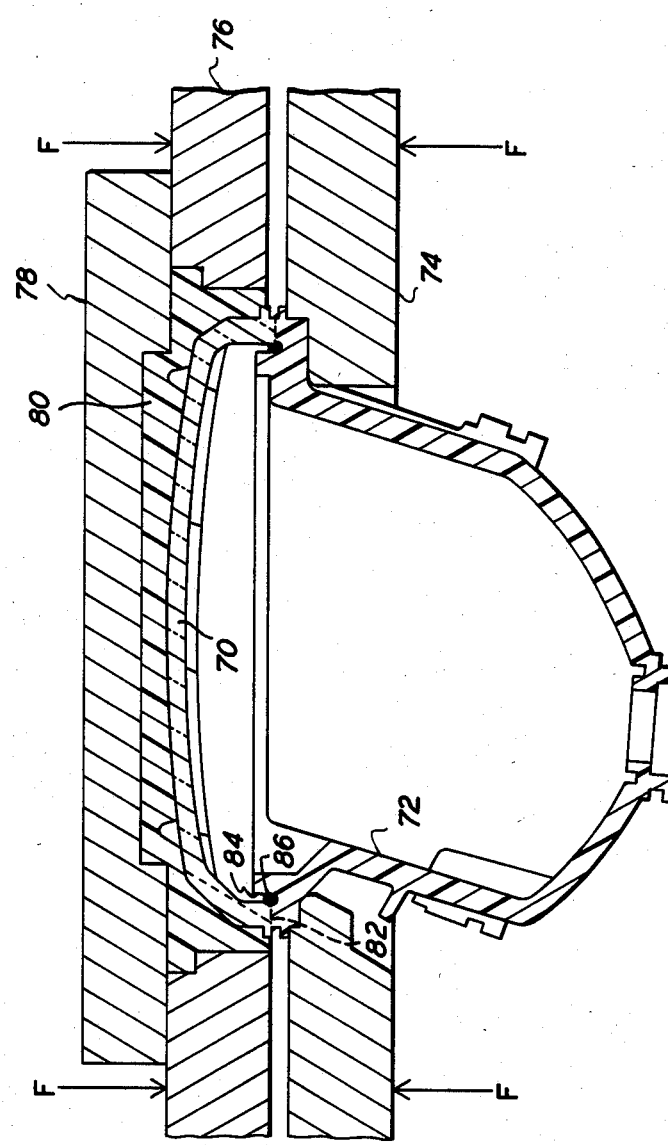
FIG. 7 is a fragmentary, elevational and sectional view illustrating an embodiment of the invention applied for the welding of a lamp housing.

FIG. 7 shows how the lens 70 and the reflector body 72 of a lamp housing, for example, for an automotive head or tail light, may be welded together in a manner to at least partially relieve stresses in the welded joint. The parts 70 and 72 are mounted in lower and upper tooling plates 74 and 76. The upper tooling assembly 78 utilizes a support 80 of rigid material (urethane or polyester). The tooling plates 74 and 76 are connected to the lower platen and drive plate of the vibration welding machine and the compressive clamping and loading forces are applied thereto in a direction perpendicular to the weld plane interface 82 between the parts 70 and 72. A flash barrier 84 is provided by a surface of the lower part 72 where the weld plane interface 82 extends to the inner surface of the parts. The flash 86 is held back by the flash barrier 84. There is therefore a consistent compressed zone at the interface 82 which is yielded during the compressive loading phase of the welding cycle so as to assure the reduction of thermal stresses in the weld joint.

Figure 8:
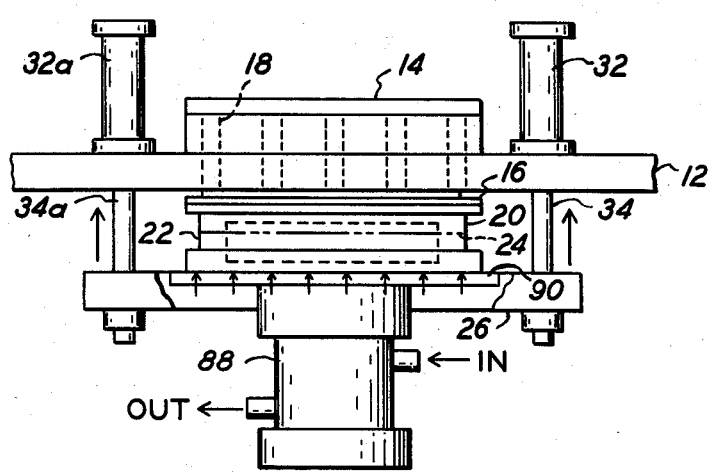
FIG. 8 is an elevational view, diagramatically illustrating a welding machine equipped to relieve stresses in welds in accordance with another embodiment of the invention.

Referring to FIG. 8, there is shown a vibration welding machine similar to the machine illustrated in FIG. 1 and like parts are identified by like reference numerals. The view, however, is from the front of the machine in FIG. 8 rather than from the side as in FIG. 1. In FIG. 8 an impact vibrator 88 is connected to an impact drive plate 90 in the lower platen 26. Hydraulic fluid may be passed into and out of fluid couplings of the impact driver 88. A succession of impacts is thus applied to the parts 20 and 22, instead of a continuous high compressive loading due to the forces applied by the cylinders 32 and 32a via the rods 34 and 34a. The forces due to the cylinders 32 and 32a may remain at low clamp pressure during the compressive loading phase of the welding cycle. The impact forces increase the low clamp forces on the interface and provide compressive loading which relieves the residual thermal stresses in the weld joint at the interface 24. The impact driver 88 may suitably be a piston type impact vibrator of the type which is commercially available and used in percussive drills. For lower force applications, pneumatically operated impact vibrators may be used instead of hydraulically operated impact or percussive drivers.

Figure 9:
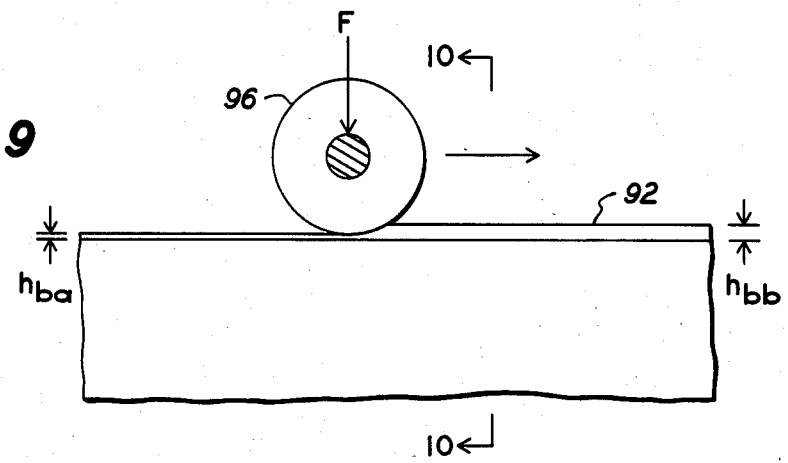
FIGS. 9, 10 and 11 are diagramatic views illustrating the use of a roller in the relieving of stresses in plastic welds in accordance with another embodiment of the invention.
Figure 10:
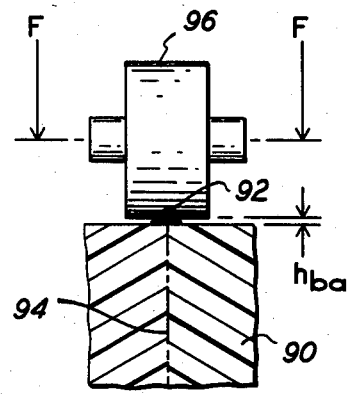

Referring to FIGS. 9 and 10 there is shown the weld zone interface and its surrounding regions 90 of a welded part. A bead or ridge of flash 92 was extruded during welding, while the interface 94 was molten. The height of the flash ridge 92 above the surface of the edges of the parts 90 is indicated as $h_{bb}$. It is, of course, the flash ridge 92 and the region of the weld joint immediately adjacent to that ridge which is exposed to solvents which induce crazing and cracking when the weld joint has thermal stresses therein. It has been found in accordance with an embodiment of the invention, that by rolling the flash ridge 92 with the aid of a roller 96, preferably during a compressive loading cycle timed in the weld cycle as shown and explained in connection with FIGS. 2 through 5, thermally induced stress in the weld zone can be reduced.

Figure 11:
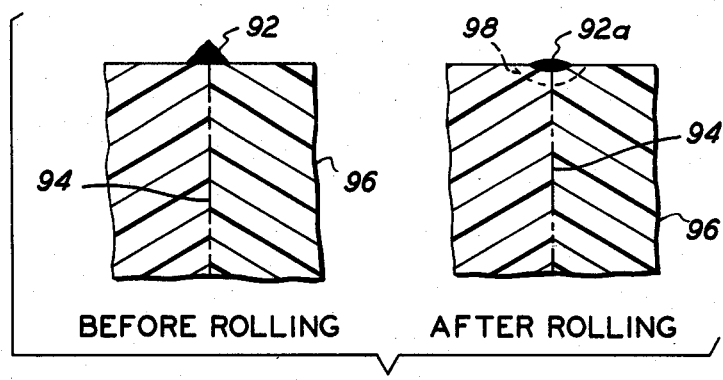

The roller 96 deforms the flash and compresses it in height from $h_{bb}$ to $h_{ba}$. This leaves, as shown on the right side in FIG. 11, a compressed flash ridge 92a, and provides the zone 98 along the outer surface of the part, to which the interface 94 extends, in which tensile stresses are relieved. The rolling is preferably accomplished in the welding machine. A machine for welding plastic automotive bumpers with compressive loading by rolling, while the bumpers are still in the welding machine, will be explained hereinafter in connection with FIGS. 14 and 15. Alternatively, the rolling may be accomplished in a separate machine, preferably with a consistent and minimum time delay between welding and rolling.

Figure 12:
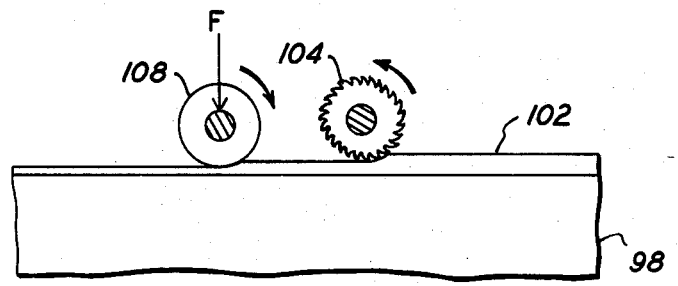
FIGS. 12, 13 and 13a are diagramatic views illustrating the use of rollers, and shaping of the edge of the parts in order to provide a smoother and more consistent surface for rolling, to relieve stresses in plastic welds in accordance with still another embodiment of the invention.
Figure 13:
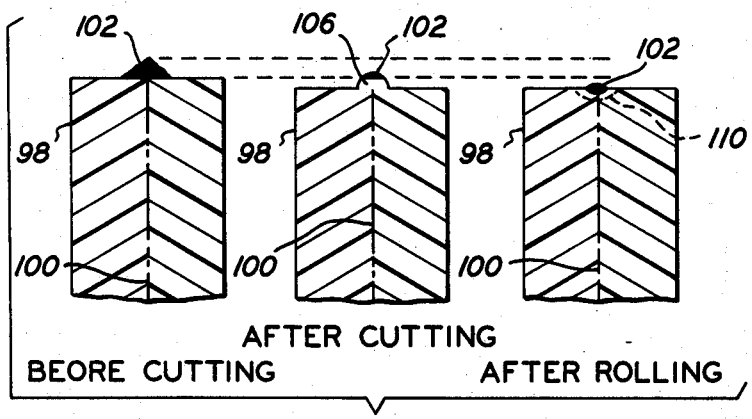
Figure 13A:
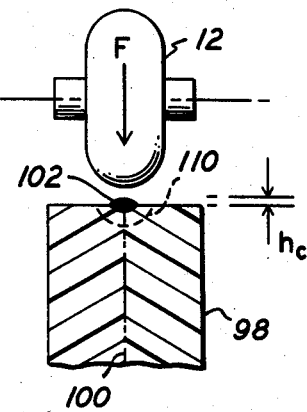

Referring to FIGS. 12, 13 and 13a, there is shown the region of welded parts 98 having the weld zone interface 100 therein. A flash ridge 102 has been extruded from the interface 100 during the weld time of the weld cycle. A shaper or milling tool 104 cuts down the edge 100 of the parts from which the flash ridge 102 extends. The tool is shaped to leave a semi-circular ridge 106 which includes a portion of the flash ridge 102. Cutting the edge of the parts 98 thereby eliminates any mismatch in the joined edges and provides a smoother, more consistent surface for rolling. A roller 108 bears upon the flash 102 and the ridge 106 and compresses and yields the flash 102 and ridge 106 leaving a compressed zone 110 in which thermally induced tensile stresses are relieved.

It may, in some cases be preferable to use a roller having a convex outer surface. Such a roller 112 is illustrated in FIG. 13a. The convex edge engages the exposed flange ridge 102 and compresses it, providing the stress relieved zone 110.

Figure 15A:
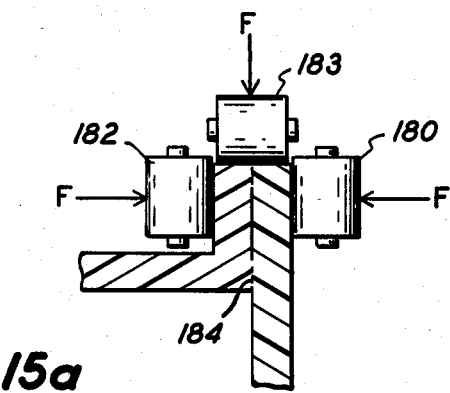
FIG. 15a is a diagramatic view illustrating the use of a plurality of rollers for the relief of stresses in plastic welds, such as those formed with a welder shown in FIGS. 14 and 15, in accordance with still another embodiment of the invention.
Figure 14:
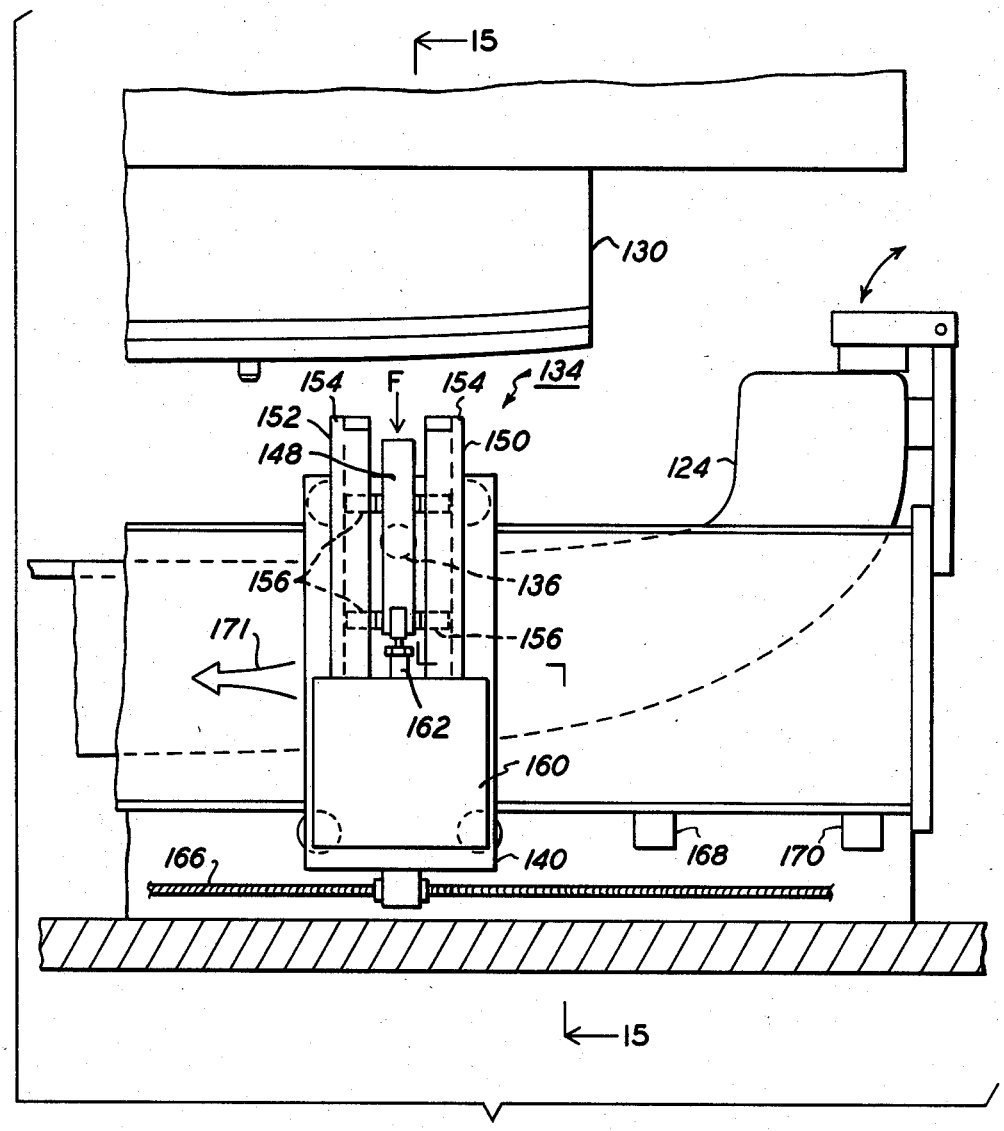
FIG. 14 is a fragmentary, elevational view of a vibration welder for welding large channel-shaped parts, such as auto bumpers, which is equipped with means for relieving stresses in welds between the channel-shaped part and a plate therein, in accordance with still another embodiment of the invention.
Figure 15:
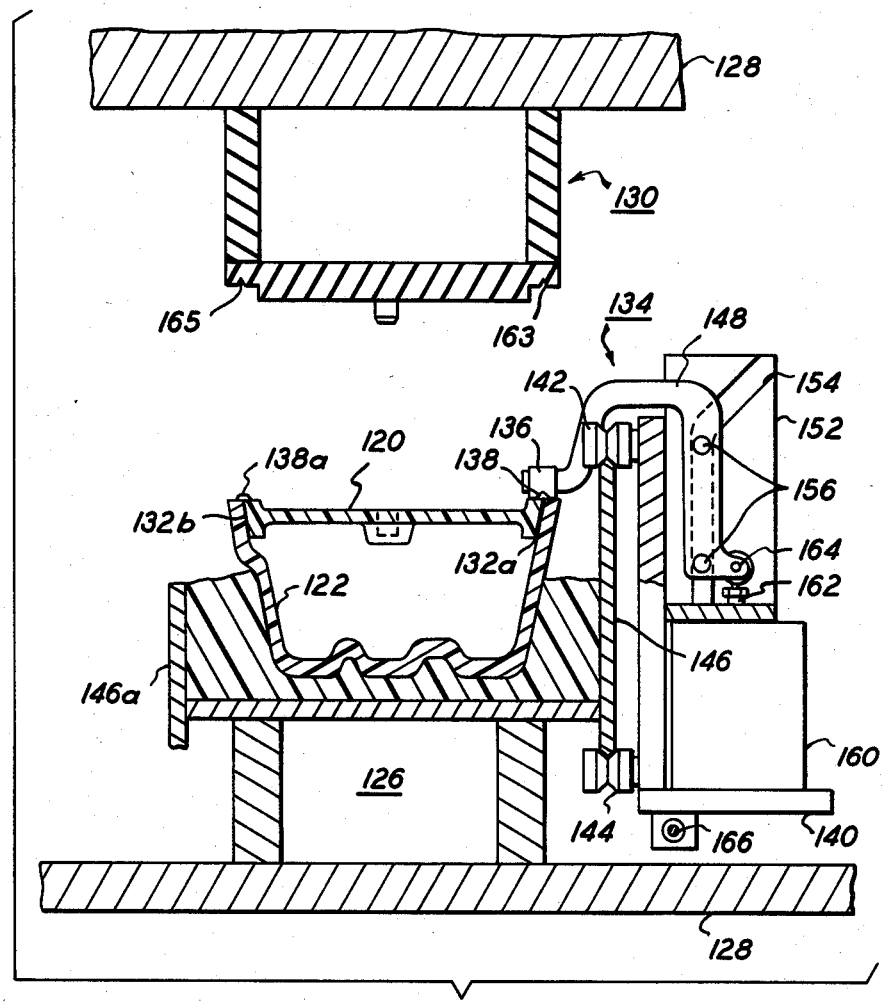
FIG. 15 is a sectional view of the apparatus shown in FIG. 14, the section being taken along the line 15—15 in FIG. 14.

Referring to FIGS. 14 and 15 there is shown a vibration welding machine which welds a support plate 120 to the sides of a channel 122 in the fabrication of a bumper assembly 124. The parts 120 and 122 are held in a tooling assembly 126 on the lower platen 128 of the machine. An upper tooling assembly 130 extends from the drive plate 128 into engagement with the upper plate 120 for the purpose of vibrating the upper plate with respect to the channel 122 to form a weld joint at the interfaces 132a and 132b between the edges of the plate 120 and the interior surfaces of the sides of the channel 122. For the sake of clarity, the channel clamping mechanism (which provides clamping forces to the outside of the channel during welding) is not shown. A rolling mechanism 134 is shown mounting a roller 136 for rolling the flash ridge 138 extruded from the interface 132a. A similar mechanism (not shown) is used for rolling the flash ridge 138a extruded from the interface 132b.

The mechanism 134 has a carriage 140 guided by rollers 142 and 144 which travel along a guide plate 146. A portion of the guide plate 146a of the mechanism for rolling the other flash ridge 138a, appears in FIG. 15. The roller 136 is mounted at the end of a moveable arm 148. Guide plates 150 and 152 have slots 154, into which guide pins 156 extend. The arm 148 is articulated by a pneumatic or hydraulic cylinder 160, the drive rod 162 of which is pivotally connected to the arm 134 at 164. Linear drive cables 166 attached to the carriage 140 move the carriage and the roller linearly along the flash ridge 138.

In operation, when the drive plate 128 and its upper tooling 130 are in engagement with the bumper parts 120 and 122, the arm 148 is articulated out of the way of the upper tooling by extending the drive rod 162. The carriage 140 may then be at one limit, for example, to the right as shown in FIG. 14. Two proximity limit switches 168 and 170, which the carriage guide rollers 144 actuate, control the lifting of the arm 148 and the stoppage of the carriage 140 when the limit position is reached. A similar set of switches may be located at the opposite end of the machine. During welding the flash ridges are molded by V-shaped barriers 163 and 165 in the upper tooling 130. After the weld time and the elapse of the delay time (see FIG. 2) and while the bumper parts are still in the machine, the carriage is traversed from right to left in the direction shown by the arrow 170. The arm 148 is brought down with the compressive loading forces applied by the cylinder 160. The carriage is then traversed along the entire length of the flash ridge 138 and compresses the ridge, forming a zone in which thermally-induced stresses are relieved to thereby avoid solvent induced cracking and crazing.

In the event that a larger stress-relieved zone is desired, a plurality of rollers 180, 182 and 183 may be used (See FIG. 15a). The rollers 180 and 182 are disposed along opposite sides of the weld zone interface 184 and apply compressive forces perpendicularly to the plane of the interface 184. The roller 183 provides compressive forces along the interface 184 and against any flash that may have been extruded from the interface 184. All rollers 180, 182 and 183 may be mounted on a traveling carriage such as shown in FIGS. 14 and 15.

Figure 19:
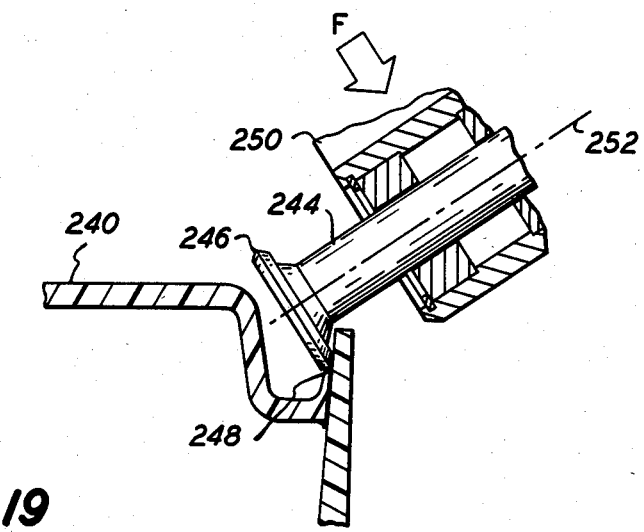
FIGS. 19 and 20 are fragmentary, diagramatic views of portions of channel-shaped parts showing the use of rollers having differently shaped edges for rolling welded joints to relieve stresses therein.

Referring to FIG. 19, there are shown bumper parts 240 and 242, similar to the bumper parts 120 and 122 (FIGS. 14 and 15), respectively. A roller 244 having a beveled edge 246, compresses and rolls the inside corner 248 and any extruded flash thereat. The roller may be mounted in a bearing assembly 250 and compressing forces (F) applied perpendicular to the roller axis 252, which is inclined to the horizontal.

Figure 20:
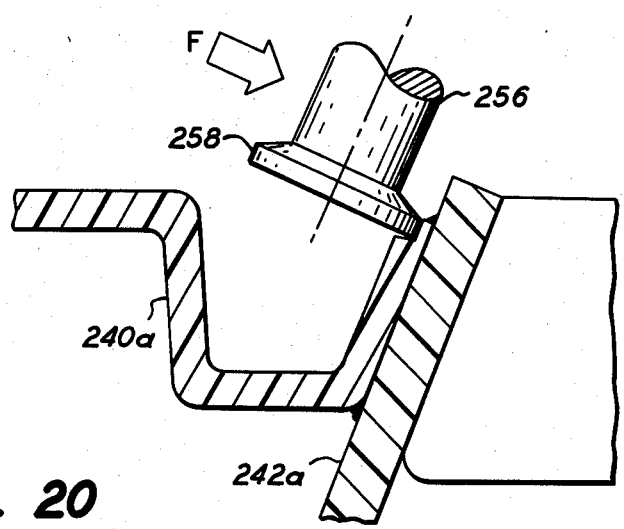

In FIG. 20, the bumper parts 240a and 242a are similar to the parts 240 and 242, except that the support plate 240a has a lip 254. A roller 256, having a cylindrically shaped edge 258, rolls and compresses the lip. Because the roller does not directly contact the extruded flash, the flash does not require molding or other confinement or shaping prior to rolling.

Figure 16:
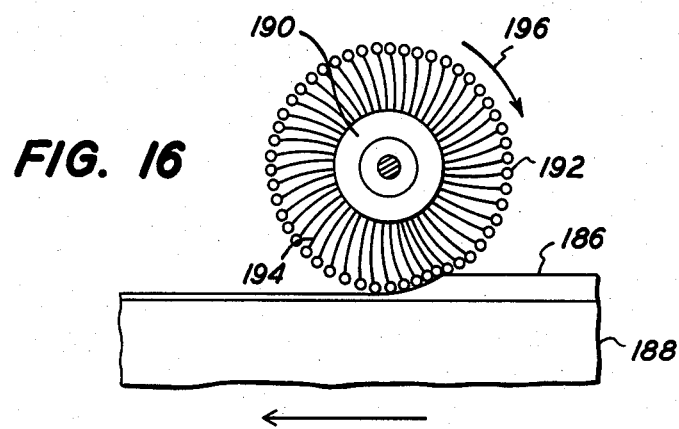
FIG. 16 is a view diagramatically illustrating the use of flail-mounted balls for peening the flash of a plastic weld to relieve stresses in the weld in accordance with still another embodiment of the invention.

Referring to FIG. 16, there is shown a flash ridge or bead 186 extruded from the weld zone interface of parts 188 which have been welded together in a vibration, hot plate, or other plastic welding machine. Compressive forces are applied to the flash ridge 186 by a peening device. This device is made up of a hub or cylinder 190 to which balls 192 of hard material such as steel are attached by means of flexible rods 194. The rods and balls are disposed next to each other successively around the roller 190. When the roller is rotated as shown by the arrow 196, the balls successively impact the flash ridge 186; compressing it to relieve thermally-induced stresses therein.

Figure 17:
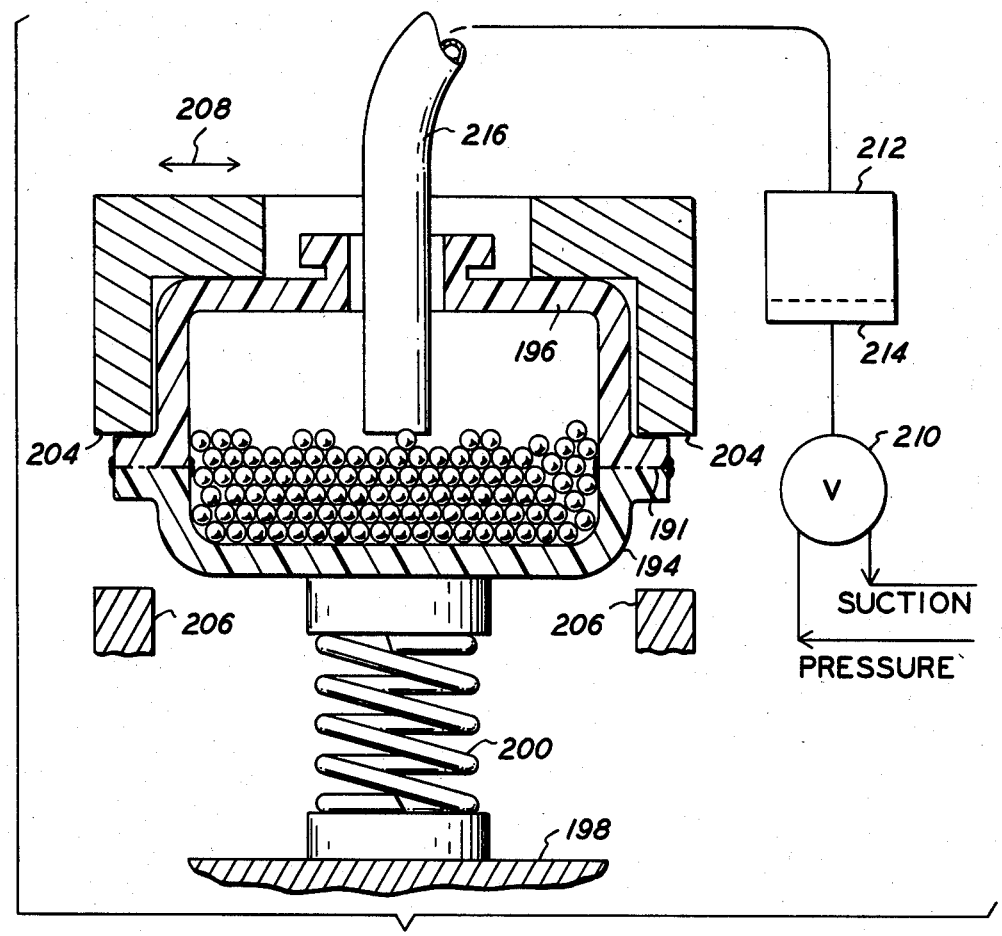
FIG. 17 is an elevational view diagramatically showing apparatus for peening plastic welds to relieve stresses therein where the welds are formed in parts defining a hollow chamber therewithin.

Referring to FIG. 17 there is shown apparatus by means of which the flash on the interior surface of plastic welded parts 194 and 196 may be peened. The lower platen 198 supports the lower part 194 via a spring support 200 to enable lateral movement. During welding, the upper and lower parts 196 and 194 are clamped together between opposed edges 204 and 206 of the upper and lower tooling. The upper tooling is vibrated during friction welding in the direction shown by the arrow 208. After welding the lower tooling 206 is lowered, the lower part 194 being supported by the spring support 200. Pressurized air is then supplied via a 3-way valve 210 into a reservoir 212 containing steel shot balls. Air passes through a screen 214 on which the balls rest in the reservoir. A hose 216 delivers the balls to the chamber defined by the upper and lower pieces 196 and 198 which have been welded together. These balls are sufficient in number to rise to a level above the weld zone interface 191. The flash ridge extruded from the interface is then exposed to the balls.

The vibratory energy is then applied to the upper tooling and results in random bouncing of the balls and peening of the inside edge of the weld joint (the weld zone interface from which the flash extends). After a period of vibration, the vibration is stopped and suction is applied via the valve 210. This draws the shot balls out via the hose 216 and back into the reservoir 212.

Figure 18:
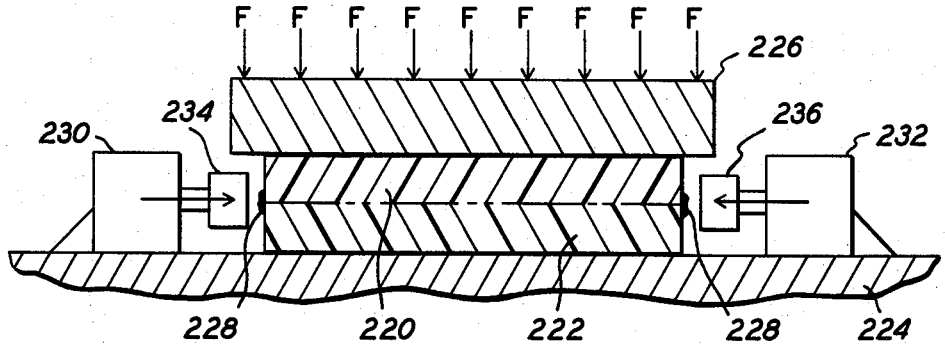
FIG. 18 is a diagramatic, elevational view illustrating apparatus for relieving stresses in plastic welds in accordance with still another embodiment of the invention.

Referring to FIG. 18, it is shown that postweld compressive loading may also be applied to the weld edge by means of pressing bars acting against the weld flash. Welded plastic parts 220 and 222 are shown, in a welding machine immediately after welding. The parts 220 and 222 are held down on the lower platen 224 of the welding machine, by compressive forces applied to a top plate 226. These forces, indicated by arrows and the letters "F", provide low clamp pressure which holds the parts 220 and 222 together during and after the welding cycle. The flash ridges 228 have extruded during the phase of the welding cycle where the surfaces of the parts 220 and 222 (which define the interface, shown by the line made up of long and short dashes) were molten. After a delay time (see FIG. 2), side loads are applied by cylinders 230 and 232, mounted opposite from the sides of the parts 220 and 222. The cylinders extend pressing bars 234 and 236 which compressively load the opposite edges of the parts 220 and 222 and compress the flash 228. Sufficient side load is used to yield the flash and the material in the weld zone interface to a substantial depth into the parts 220 and 222, thereby relieving stresses in the exposed sides which would otherwise give rise to crazing and cracking when the sides were exposed to solvents.

From the foregoing description, it will be apparent that there has been provided improved methods and apparatus for plastic welding by means of which thermally induced stresses may be alleviated. While various methods and means of practicing the invention have been described, variations and modifications thereof within the scope of the invention will undoubtedly suggest themselves to those skilled in the art. Accordingly, the description should be taken as illustrative and not in a limiting sense.

We claim:

1. In the welding of plastic parts wherein a weld is formed at an interface between the parts, the method of treating the weld which comprises the steps of supporting portions of said parts to expose an edge of said parts, and after said weld is formed and has cooled to a solid condition with tensile stresses developed therein and while said weld is still warmer than and of reduced yield strength relative to areas of said parts adjacent to said weld, then applying compressive forces selectively to said portions, said forces being of sufficient magnitude and held for sufficient duration to produce yielding selectively in the warmer and tensile-stressed zones of said weld, to at least partially relieve tensile-stresses in said weld and thereby reduce the susceptibility of said weld to a solvent induced crazing and cracking.

2. The invention according to claim 1 wherein said steps are carried out in the machine in which said parts are welded.

3. The invention according to claim 2 wherein the forces holding said parts during welding are increased to provide said compressive and yielding forces.

4. The invention according to claim 1 wherein said steps are carried out outside the machine in which said parts are welded.

5. The invention according to claim 1 wherein said forces result in contact pressures from 2,000 to 20,000 psi.

6. The invention according to claim 1 wherein said forces are applied by rolling a roller over said parts along said portions and the weld interface there between.

7. The invention according to claim 6 wherein one of said parts has a lip extending from an outside edge of said parts and said forces are applied by passing said roller over said lip with said forces applied toward said interface.

8. The invention according to claim 6 further comprising removing material from said parts along the flash extruded from said parts, leaving a smooth and consistent ridge containing a portion of said flash, and then passing said roller along said portion to compress said portion.

9. The invention according to claim 8 wherein said rolling is carried out with a roller having a convex rolling surface and pressing said roller against said parts to bring the apex of said convex rolling surface into engagement with said flash.

10. The invention according to claim 1 wherein said forces are applied only to flash extruded from said interface by passing a roller over said flash to yield only said flash and the tensile-stressed zone of said weld immediately adjacent to said flash thereby avoiding creation of tensile-stresses in said exposed portions of said parts.

11. The invention according to claim 10, wherein said flash is extruded from an inside corner defined by the end of one part and the side of another, and said roller has a beveled edge conforming in shape to said corner.

12. The invention according to claim 10 wherein said parts are a channel and a plate in said channel, which define said interfaces between the edges of said plate and the sides of said channel, said forces being applied by supporting a roller for movement toward and away from said interface, to bring said roller into compressive engagement with said parts at said interface and moving said roller while it is in compressing relationship with said parts at said interface along said interface.

13. The invention according to claim 1 wherein flash is extruded along an edge of the weld interface between said parts, to form ridges of said flash on said edge and said forces are applied against said ridges along the plane of said interface, to selectively localize compression of said ridges and the tensile-stressed zone of said weld immediately adjacent to said flash thereby avoiding creation of new tensile-stresses in the exposed portions of said parts.

14. The invention according to claim 1 wherein said forces are applied by passing a plurality of rollers along said interface perpendicular to the plane of said interface and in the plane of said interface.

15. In the welding of plastic parts wherein a weld is formed at an interface between the parts, the method of treating the weld which comprises the steps of supporting said parts to expose portions including said interface which portions extend to an edge of said parts, and applying compressive forces selectively to said portions, said forces being of sufficient magnitude and held for a sufficient duration to produce yielding in tensile-stressed zones of said weld, to at least partially relieve tensile-stresses in said weld and thereby reduce the susceptibility of said weld to a solvent-induced crazing and cracking, and said compressive forces being applied as impact forces.

16. In the welding of plastic parts wherein a weld is formed at an interface between the parts, the method of treating the weld which comprises the steps of supporting said parts to expose portions including said interface which portions extend to an edge of said parts, and applying compressive forces selectively to said portions, said forces being of sufficient magnitude and held for a sufficient duration to produce yielding in tensile-stressed zones of said weld, to at least partially relieve tensile-stresses in said weld and thereby reduce the susceptibility of said weld to a solvent-induced crazing and cracking, and, said forces being applied to flash extruded from said interface by peening said flash.

17. The invention according to claim 16 wherein said peening step is carried out by suspending a plurality of balls successively along the periphery of a rotating body, and rotating said body to impact said balls successively along said flash while said body travels along said flash.

18. In the welding of plastic parts wherein a weld is formed at an interface between the parts, the method of treating the weld which comprises the steps of supporting said parts to expose portions including said interface which portions extend to an edge of said parts, and applying compressive forces selectively to said portions, said forces being of sufficient magnitude and held for a sufficient duration to produce yielding in tensile-stressed zones of said weld, to at least partially relieve tensile-stresses in said weld and thereby reduce the susceptibility of said weld to solvent-induced crazing and cracking, and said forces being applied by passing a plurality of rollers along said interface to apply said forces both compressively in the plane of said interface and perpendicular to said plane.

19. In the welding of plastic parts wherein a weld is formed at an interface between the parts, the method of treating the weld which comprises the steps of supporting said parts to expose portions including said interface which portions extend to an edge of said parts, and applying compressive forces selectively to said portions, said forces being of sufficient magnitude and held for a sufficient duration to produce yielding in tensile-stressed zones of said weld, to at least partially relieve tensile-stresses in said weld and thereby reduce the susceptibility of said weld to a solvent-induced crazing and cracking, and said parts defining a chamber therein when brought together at said interface with an opening in said chamber encompassed by said interface, and said greater than yield strength forces are applied by filling said chamber to a level above the plane of said interface with balls, and vibrating said chamber in a direction along the plane of said interface to peen the surface of said parts defining the interior of said chamber to which surface said interface extends.

20. Apparatus for relieving tensile-stresses in plastic parts at an interface defined by surfaces which are heated to melt and held together to fuse and form a weld extending to an edge of said parts, which comprises means for supporting said parts to expose portions which include said interface, and means for applying compressive forces of sufficient magnitude and duration to deform the weld zone at said interface in said exposed portions to relieve said tensile-stresses, said force applying means being operative to peen flash extruded from said interface.

21. The apparatus according to claim 20 wherein said force applying means comprises a rotating body, a plurality of balls flexibly suspended successively along the periphery of said body, and means for rotating said body to peen said balls successively along the flash.

22. Apparatus for relieving tensile-stresses in plastic parts at an interface defined by surfaces which are heated to melt and held together to fuse and form a weld extending to an edge of said parts, which comprises means for supporting said parts to expose portions which includes said interface, and means for applying compressive forces of sufficient magnitude and duration to deform the weld zone at said interface in said exposed portions to relieve said tensile-stresses, said force applying means being operative to apply said forces as impact forces.

23. Apparatus for relieving tensile-stresses in plastic parts at an interface defined by surfaces which are heated to melt and held together to fuse and form a weld extending to an edge of said parts, which comprises means for supporting said parts to expose portions which includes said interface, and means for applying compressive forces of sufficient magnitude and duriation to deform the weld zone at said interface in said exposed portions to relieve said tensile-stresses, said parts defining a chamber therein when brought together at said interface with an opening in said chamber and encompassed by said interface, and said means for applying said forces comprises balls filling said chamber to a level above the plane of said interface, and means for vibrating said chamber in a direction along the plane of said interface to peen the surface of said parts defining the interior of said chamber to which surface said interface extends.

24. In the welding of plastic parts to form a weld interface, by heating the surface of the parts which define said interface above melting temperature and holding the parts together to enable said surfaces to fuse at said interface, the method of reducing thermally-induced stresses in said weld which comprises the steps of applying forces to the weld zone, including said interface, while said parts are cooling after welding, said weld has solidified and while said zone and interface is at a higher temperature than the regions of said parts adjacent thereto, which forces are higher than the yield strength of the material of said parts in said weld zone and lower than the yield strength of said material in said adjacent regions, and continuing the application of said forces while said weld zone continues to cool, whereby to impart stresses which compensate for thermally induced stresses.

25. The method according to claim 24 wherein the step of applying said forces is carried out by applying said forces to said parts while holding them together.

26. The method according to claim 25 wherein said higher than yield strength forces are greater than said holding forces.

27. The method according to claim 24 wherein said higher than yield strength forces are compressive on the material at said interface.

28. The method according to claim 27 wherein the holding forces are such that the pressure on said interface is from 100 to 600 psi and said greater than yield strength forces are such that the pressure on said interface is from 2,000 to 20,000 psi.

29. The method according to claim 27 wherein the forces holding said parts together are compressive forces transverse to said interface, and said higher than yield strength forces are also compressive forces in the same direction as said holding forces.

30. The method according to claim 29 wherein the holding forces are such that the pressure on said interface is from 100 to 600 psi and said greater than yield strength forces are such that the pressure on said interface is from 2,000 to 20,000 psi.

31. The method according to claim 29 wherein said holding forces are increased to provide said higher than yield strength forces.

32. The method according to claim 24 wherein flash is extruded from the outer surface of said parts at said interface and said higher than yield strength forces are applied to said interface via said flash in a direction to compress said flash.

33. The method according to claim 24 further comprising trapping flash extruding from said interface.

34. The method according to claim 33 wherein said flash trapping step is carried out with the aid of traps within said parts, said traps extending to said interface.

35. The method according to claim 33 wherein said flash trapping step is carried out with the aid of at least one barrier spaced from a surface of said parts to which said interface extends.

36. The method according to claim 24 wherein said interface changes from molten to solid condition while cooling, first reaching the temperature where said interface becomes solid at a predetermined time after said parts are held together to enable them to fuse at said interface, and said greater than yield strength forces are applied a given interval after said predetermined time.

37. The method according to claim 36 wherein the surface of said parts are heated until they melt and held together with the aid of a welding machine, said greater than yield strength forces being applied while said parts are maintained in said machine.

38. The method according to claim 36 wherein said greater than yield strength forces are impact forces applied with the aid of a percussive force generator attached to a platen of said machine which applies said holding forces.

39. The method according to claim 24 wherein said greater than yield strength forces are applied as impact forces.

40. The method according to claim 39 wherein said impact forces are applied by applying successive impacts to said parts in the same direction as said holding forces for a period of time starting with the expiration of said given interval.

41. The method according to claim 24 wherein said greater than yield strength forces are applied by rolling a roller over said parts in a direction along said interface.

42. The method according to claim 41 wherein said rolling is carried out with a roller having a convex rolling surface, and pressing said roller against said parts to bring the apex of said convex rolling surface into engagement with said flash.

43. The method according to claim 41 wherein one of said parts has a lip extending an edge of said interface, and said roller is passed over said lip to apply said greater than yield strength forces to said interface.

44. The method according to claim 41 wherein one of said parts has an end which overlaps the surface of the other of said parts to define an inside corner, said roller having a beveled edge conforming in shape to said corner, and said beveled edge is inserted into said corner while rolling over said flash in said corner.

45. The method according to claim 41 further comprising removing material from said parts along the flash extruded from said parts, leaving a smooth and consistent ridge containing a portion of said flash, and then passing said roller along said portion to compress said portion.

46. The method according to claim 45 wherein said rolling is carried out with a roller having a convex rolling surface, and pressing said roller against said parts to bring the apex of said convex rolling surface into engagement with said ridge.

47. The method according to claim 24 wherein said greater than yield strength forces are applied to flash extruded from said interface by passing a roller over said flash to yield said flash.

48. The method according to claim 24 wherein said greater than yield strength forces are applied to flash extruded from said interface by peening said flash.

49. The method according to claim 48 wherein said peening step is carried out by suspending a plurality of balls successively along the periphery of a rotating body, and rotating said body to impact said balls successively along said flash while said body travels along said flash.

50. The method according to claim 24 wherein said flash is extruded through surfaces on opposite sides of said parts to which said interface extends, to form ridges of said flash on said opposite sides, and said higher than yield strength forces are applied in opposite directions, from each of said opposite sides, against said ridges, along the plane of said interface, to compress said ridges.

51. The method according to claim 38 wherein said greater than yield strength forces are applied by passing a plurality of rollers along said interface to apply said greater than yield strength forces both compressively in the plane of said interface and perpendicular to said plane.

52. The method according to claim 24 wherein said parts define a chamber therein when brought together at said interface, with an opening in said chamber encompassed by said interface, and said greater than yield strength forces are applied by filling said chamber to a level above the plane of said interface with balls, and vibrating said chamber in a direction along the plane of said interface to peen the surface of said parts defining the interior of said chamber, to which surface said interface extends.

53. The method according to claim 24 wherein said parts are a channel and a plate in said channel, which define said interfaces between the edges of said plate and the sides of said channel, said greater than yield strength forces being applied by supporting a roller for movement toward and away from said interface, to bring said roller into compressive engagement with said parts at said interface after said interface has fused to form a weld and while said weld zone is warmer than the regions of said plate and channel adjacent thereto, and moving said roller while it is in compressing relationship with said parts at said interface along said interface.

* * * * *